INVENTOR
John F. McCoy
BY
ATTORNEYS

United States Patent Office 2,805,393
Patented Sept. 3, 1957

2,805,393

SYSTEM AND METHOD FOR DETERMINING REVERSAL TIME FOR TWIN-TYPE MAGNETIC CLUTCHES

John F. McCoy, Haddonfield, N. J., assignor, by mesne assignments, to the United States of America as represented by the Secretary of the Navy Application December 1, 1953, Serial No. 395,633

5 Claims. (Cl. 324—68)

(Granted under Title 35, U. S. Code (1952), sec. 266)

This invention relates to a system for determining the reversal time for twin-type magnetic clutches.

Reversal time is defined as the time interval required for the complete mechanical response of a twin-type magnetic clutch to an instantaneous transfer of current from one coil of said clutch to the other coil, when the following parameters are maintained constant: (1) The angular velocity at the input shaft of the clutch; (2) The moment of inertia of the load applied to the output shaft of the clutch; (3) The clutch coil current during individual duty cycles; and (4) Ambient temperatures.

Complete mechanical response is defined as load deceleration from a given angular velocity in one direction to zero velocity, and acceleration to an equal angular velocity in the opposite direction.

A knowledge of reversal time of a twin-type magnetic clutch finds extensive use in providing an important criterion for evaluating the performance thereof.

It is an object of this invention, therefore, to provide a simple and accurate system for measuring the reversal time of a twin-type magnetic clutch.

It is another object of this invention to provide a method for determining the reversal time of a twin type magnetic clutch.

A still further object of this invention is the determination of the reversal time of a twin-type magnetic clutch by obtaining an oscillographic trace of angular displacement of the output shaft versus time and superimposing thereon a pair of narrow pulses, said narrow pulses representing, respectively, the time of the start of reversal of the clutch, and the time said reversal is completed, the time interval between said narrow pulses being the reversal time of said clutch.

Still another object of this invention is the provision of a system and method for determining the reversal time of a load driven by a reversible means having alternately energizable magnetic elements wherein the angular displacement of said load versus time is plotted, and wherein a first narrow pulse, representative of the start of the reversal cycle is superimposed on said plot and where a second narrow pulse is manually superimposed on the trace at the point of full reversal, and wherein the time interval between said narrow pulse is measured.

For a more complete understanding of the nature of this invention, reference should be had to the following detailed description, taken in connection with the accompanying drawings in which.

Figure 1:
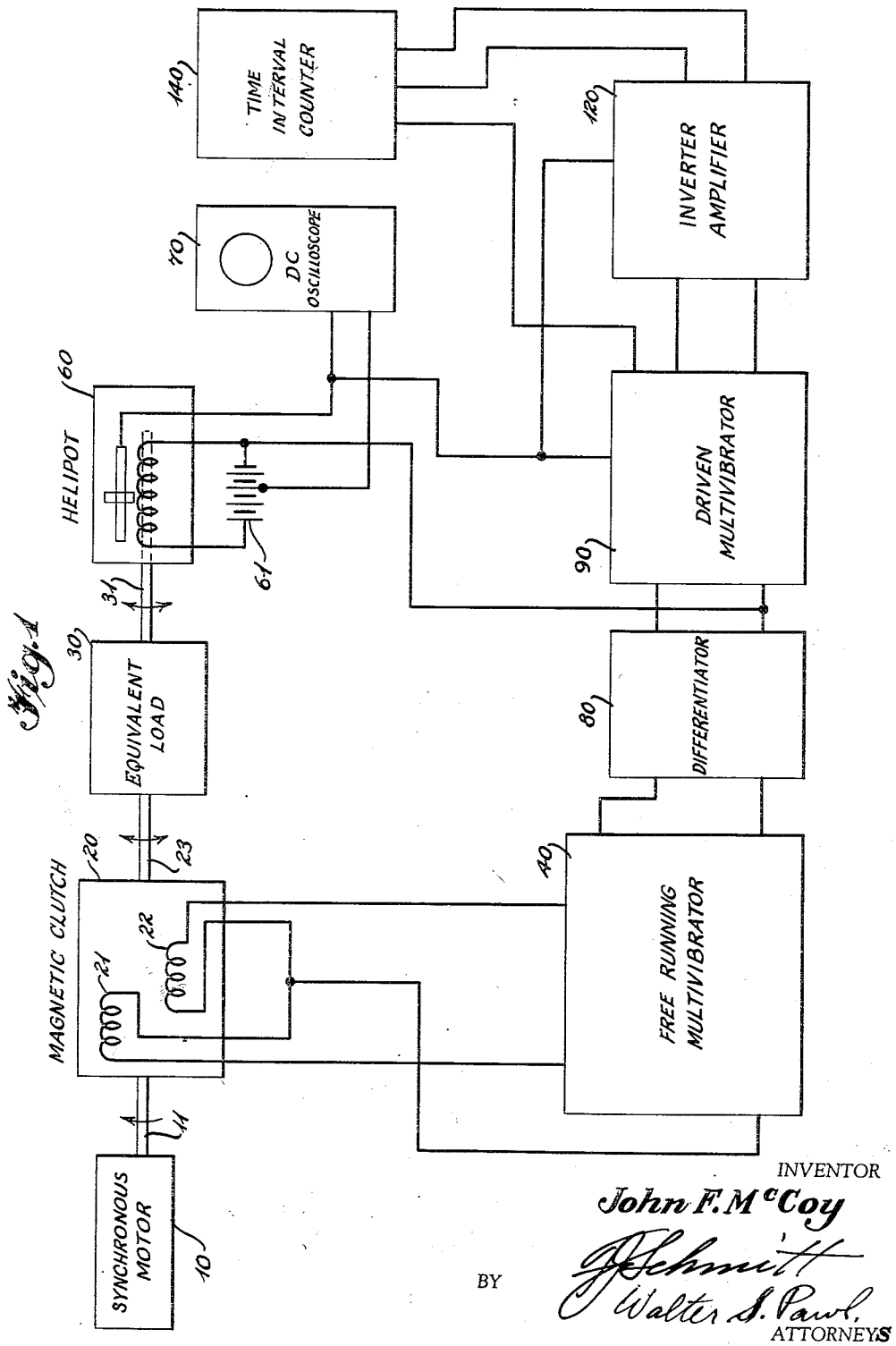
Fig. 1 is a block diagram schematically showing the relationship of the elements in the measuring system.

The general organization of the system is disclosed in Figure 1 wherein is shown a synchronous motor 10 coupled through the shaft 11 to the twin-type magnetic clutch 20 having clutch coils 21 and 22. The clutch 20, when properly energized, reversibly drives a constant load 30 having an output shaft 31, through the shaft 23. The synchronous drive motor 10 has been employed to provide a constant angular velocity at the input of the twin clutch unit, as required above.

To reverse the direction of rotation of the load 30, current must be switched from one clutch coil 21 or 22 to the other. This is accomplished by means of the free running multivibrator 40 which insures instantaneous change over. The wave forms of the outputs from the free running multivibrator are shown in Figures 3b and 3c, to which reference should now be made.

The current represented by the wave form of Figure 3b is utilized to energize coil 21, while the current represented in Figure 3c is used to energize coil 22. It is seen that, the current in coil 21, as shown in Figure 3b, flows during the interval between times $t_1$ and $t_2$ and that at time $t_2$, current is switched from the coil 21 to the coil 22.

The curve shown in dotted lines in Figure 3a represents the theoretical angular displacement of the load output shaft 31 versus time, and it is seen that, in theory, reversing time is zero. A practical clutch unit, however, produces a curve such as shown in solid lines in Figure 3a, where it is shown that the angular velocity of the load output shaft 31 is constant from time $t_1$ to $t_2$, but varies from time $t_2$ to $t_4$, decelerating to a zero angular velocity at time $t_3$, and accelerating to an angular velocity at $t_4$ which is equal and opposite to the velocity of the shaft at time $t_2$. Angular displacement then continues at a constant angular velocity until time $t_5$ when the cycle is again reversed. Reversal time, as defined above, is therefore, the interval between times $t_2$ and $t_4$. Applicant's system has been devised to measure this interval.

To produce the solid line curve of Figure 3a, a conventional helipot 60, energized by a battery 61, is driven by the output shaft 31 of the load 30, and the output thereof is applied to a D. C. oscilloscope 70. The resistor of the helipot must be substantially linear, so that the curve resulting on the oscilloscope will be an actual representation of angular displacement of the load 30 versus time.

While in a typical twin-type magnetic clutch, the time interval after time $t_2$ required for the coil current to reach .63 percent of maximum was on the order of .034 millisecond, reversal time, as determined in the typical subject system was approximately 1,000 times as long. In other words, even though 63 percent of full reverse torque was applied to the output shaft only .034 milliseconds after time $t_2$, this reverse torque did not result in a complete reversal until about 34 milliseconds had elapsed thereafter, due to a condition of mechanical slip prevailing during the major portion of the time interval $t_2-t_4$. Since it is seen that the reverse torque was constant during all but a small fraction of the time $t_2-t_4$, the portion of the oscillographic trace from $t_2-t_4$ is, for all practical purposes, symmetrical about a vertical line drawn through point $t_3$ in Figure 3a. By induction, therefore, time $t_4$ occurs at the intersection of the oscillographic trace with a horizontal line drawn through point $t_2$. The principle of operation of this system is based on this last statement.

Figure 3:
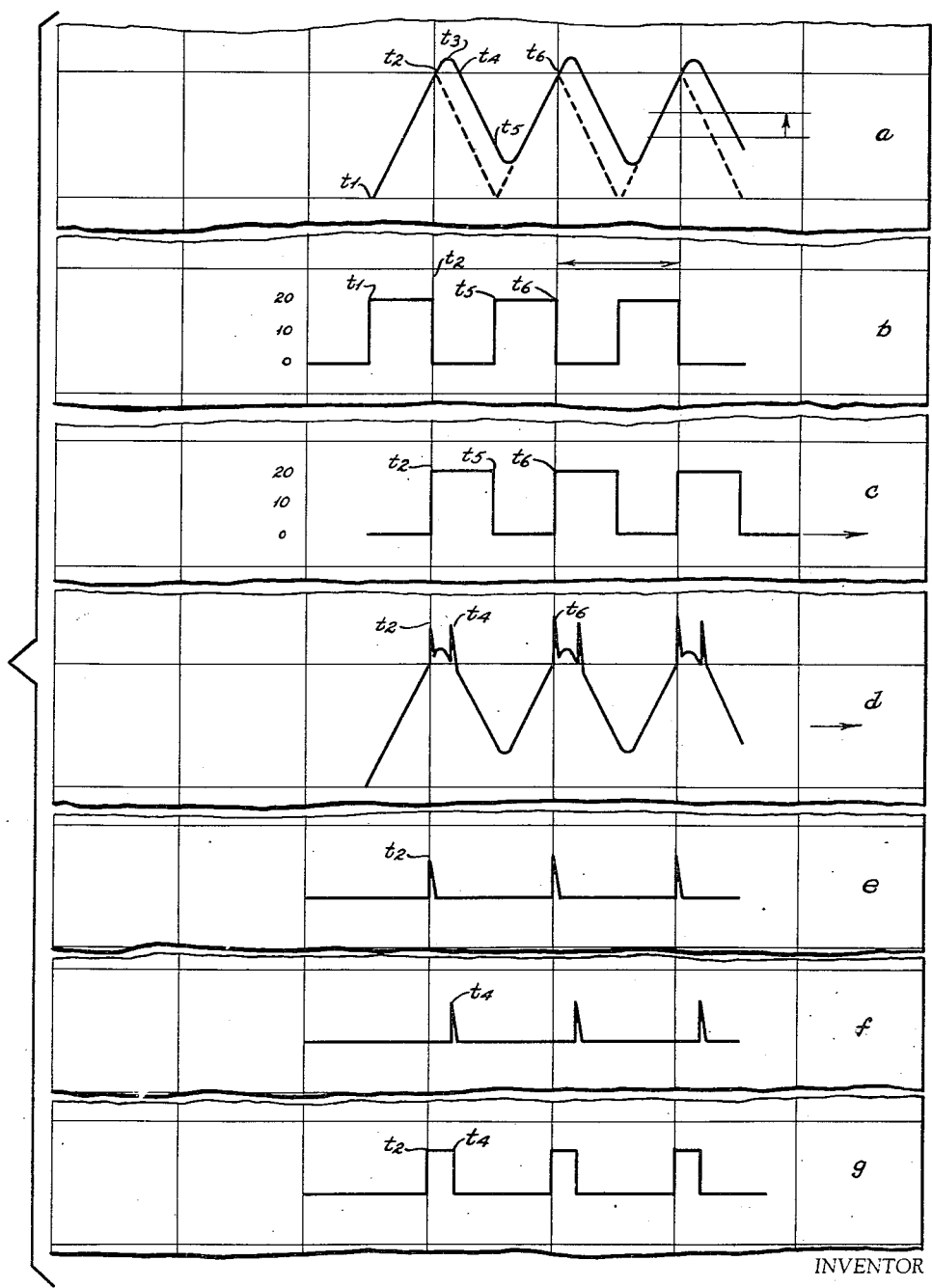
Fig. 3 is a series of curves showing the operation of the various circuit components at various critical times.

Having produced the solid line curve of Figure 3a on the oscilloscope 70, it is necessary to identify the points $t_2$ and $t_4$, as shown in Figure 3d. A narrow positive pulse or pip, as shown in Figure 3e, produced by energizing the driven multivibrator 90 by means of the differentiator 80 attached to the free running multivibrator, determines the position of point $t_2$ on the oscillographic trace. The position of point $t_4$ is determined as explained above, and a second pip, as shown in Figure 3f, produced by a differentiator in the circuit of the inverter-amplifier 120 is manually positioned on the trace to occur at said point. Besides being superimposed on the oscillographic trace, as shown in Figure 3, the two pips are fed to a conventional time interval counter 140 wherein the interval between the leading edges of the pips at $t_2$ and $t_4$ may be readily determined. The time interval counter 140, may also be used to determine the multivibrator period by determining the interval between $t_2$ and $t_6$.

Figure 2:
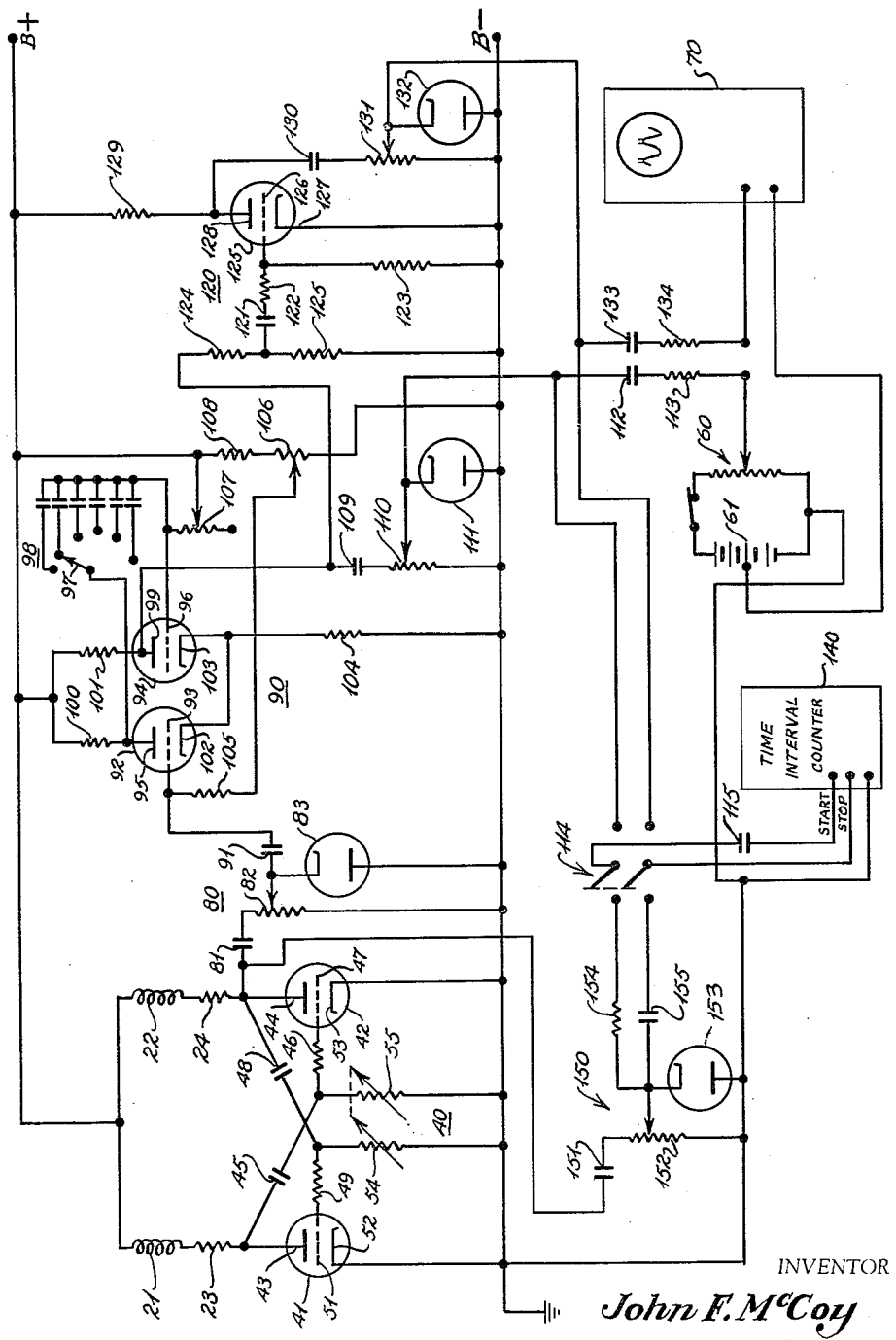
Fig. 2 is a schematic diagram showing the circuit components embodied in this invention.

Reference should now be made to Figure 2 of the drawings wherein the circuit for accomplishing applicant's results is shown.

The clutch coils 21 and 22 of the twin clutch 20 are respectively connected through the damping resistors 23 and 24 to the plate circuits of the triodes 41 and 42 of the free-running multivibrator 40. The plate 43 of triode 41 is coupled through condenser 45 and grid-stopping resistor 46 to the grid 47 of the triode 42. Also, plate 44 of triode 42 is coupled through condenser 48 and grid-stopping resistor 49 to the grid 51 of the triode 41. A B+ supply is connected to the multivibrator 40 through the clutch coils 21 and 22, and the cathodes 52 and 53 are grounded at B—. A dual potentiometer comprising the resistors 54 and 55 provides the grid leak paths for the grids 51 and 47, respectively, and also provides discharge paths for condensers 48 and 45. The setting of the dual potentiometer determines the period of the free running multivibrator 40. As explained above, the coils 21 and 22 will be alternately energized by the outputs from the triodes 41 and 42, the output having a form shown in Figures 3b and 3c. As the clutch unit 20 is rotated by the motor 10, the alternate energization of the coils 21 and 22 causes the alternate reversal of the load 30 and the angular displacement of the load versus time is determined by means of the driven helipot 60 which produces a trace, as shown in Figure 3a, on the oscilloscope 70.

A portion of the output of the multivibrator is coupled to the differentiator-clipper network 80, comprising a condenser 81, a variable resistor 82, and a diode 83, which produces a positive pulse which is applied through the condenser 91 to the grid 93 of the triode 92 of the driven multivibrator 90. The plate 95 of the triode 92 is coupled to the grid 96 of the triode 94 through the switch 97 and through one of the condensers 98, each of which has a different capacitance value. The plates 95 and 99 are connected to the B+ supply through the plate resistors 100 and 101 respectively, while the cathodes 102 and 103 are connected together and grounded through resistor 104. The grid bias for the triode 92 is obtained through grid leak resistor 105 from a voltage divider comprising resistor 108 and potentiometer 106. The setting of the tap on potentiometer 106 determines the bias voltage applied to grid 93 of triode 92, and thus determines the acceptance level of the driven multivibrator 90 for pulses applied to grid 93 of triode 92. The grid bias for triode 94 is obtained from the B+ supply through variable grid leak resistor 107. Resistor 107 also provides a discharge path for one side of the condensers 98. The capacitance chosen by the setting of switch 97, in combination with the resistance chosen by the setting of variable resistor 107 determine the duration of the rectangular pulses generated by driven multivibrator 90 at plate 99 of triode 94. The voltage at plate 99 of triode 94 is represented by the curve in Figure 3g when the capacitance and resistance values determined by the settings of switch 97 and variable resistor 107, respectively, cause the duration of the rectangular pulses at plate 99 of triode 94 to be equal to the time interval $t_2$ to $t_4$. The output from the plate 99 is applied to two differentiator-clipper network circuits.

The first differentiator, comprising the condenser 109, variable resistor 110, and diode clipper 111, produces narrow positive pulses which occur at the initiation of alternate clutch reversals. These pulses, which are represented in Figure 3e, are superimposed on oscilloscope trace, represented by Figure 3a, through the condenser 112 and resistor 113, and are applied to the time interval counter 140 through the switch 114 and condenser 115.

The second differentiator, located in the inverter-amplifier circuit 120 comprises a condenser 121, and resistors 122 and 123. The output from plate 99 of triode 94 is applied to the input circuit of the second differentiator from the junction between the resistors 124 and 125. This second differentiator produces narrow positive pulses which occur at the initiation of alternate clutch reversals, and narrow negative pulses which occur at times corresponding to the occurrences of the trailing edges of the rectangular pulses produced by the driven multivibrator 90. Both the positive and negative pulses from the differentiator are applied to the grid 126 of the inverter-amplifier triode 125, having a grounded cathode 127 and a plate 128 connected to B+ through a plate resistor 129. Since the triode 125 is designed to operate at zero bias, positive pulses of high amplitude applied to the grid will be clipped and will not substantially effect operation thereof. A negative pulse will, however, cause the tube to cut off, thereby increasing the voltage at plate 128. The differentiator, including capacitor 130 and potentiometer 131, acts to narrow these positive pulses but also tends to cause a negative pulse following each positive pulse. This negative pulse is prevented by diode 132. The increased plate voltage is applied to another differentiator circuit consisting of condenser 130, resistor 131 and diode 132. The increase of plate voltage will appear, therefore, as a narrow positive pulse across the resistor 131. This narrow positive pulse, which is represented by the curve 3f, is superimposed on the oscilloscope trace through condenser 133 and the resistor 134, and is applied to the time interval counter 140 through the switch 114.

For the purpose of providing a simple means for measuring the multivibrator period, i. e., the interval between $t_2$ and $t_6$, a differentiator clipper circuit 150, comprising the condenser 151 coupled to the plate 44 of triode 42 and the variable tap resistor 152 and the diode 153, are provided, and the pulses produced at $t_2$ and $t_6$ are coupled to the time interval counter 140 through the resistor 154, condenser 155 and the switch 114.

In the operation of the equipment described, an operator would first throw the switch 114 to the right to connect the various output circuits to the time interval counter 140. There would then be observed on the oscilloscope screen, a curve similar in appearance to that of Figure 3d. The pulse shown at $t_4$, however, will not necessarily occur at the intersection of the oscillographic trace with a horizontal line drawn through the point $t_2$. This is accomplished by varying the duration of the rectangular pulse produced by the driven multivibrator 90 by adjusting the position of switch 97 and by varying resistor 107. When properly adjusted, the time $t_2$ to $t_4$ may be read from the time interval counter 140.

To obtain the multivibrator period, $t_2$ to $t_6$, the switch 114 is merely thrown to left, and the interval is read from the time interval counter 140.

Although I have shown and described one specific embodiment of my invention, it is apparent that many modifications thereof are possible. My invention, therefore, is not to be restricted except in so far as is necessitated by the prior art and by the spirit of the appended claims.

I claim:

1. In a twin type magnetic clutch system having a reversibly driven load, a system for measuring the reversal time of said load comprising: a magnetic clutch having reversing coils; a free running multivibrator connected to said coils for alternately energizing each of the coils of said magnetic clutch; a differentiator connected to said multivibrator for producing a narrow pulse; a driven multivibrator connected to said differentiator and triggered by said narrow pulse for producing a rectangular pulse; means connected to said driven multivibrator for varying the duration of said rectangular pulse so as to equal said reversal time; means connected to said driven multivibrator for producing a second narrow pulse at the occurrance of the leading edge of said rectangular pulse; means connected to said driven multivibrator for producing a third narrow pulse at the occurrence of the trailing edge of said rectangular pulse; and circuit means connected to each of said second and third pulse producing for measuring the interval between said second and third narrow pulses.

2. In a twin type magnetic clutch system having a reversibly driven load coupled thereto and having means for instantaneously transferring energy alternately from one coil of said clutch to the other coil of said clutch, a system for measuring the reversal time of said load comprising; a magnetic clutch having reversible coils; means coupled to said load for producing an oscillographic trace of the angular displacement of said load along a time base; a driven multivibrator connected to said clutch coils; means coupled to said multivibrator and responsive to the instantaneous transfer of energy from one of said coils to the other of said coils for triggering said driven multivibrator and thereby producing a rectangular pulse; means coupled to the output of said driven multivibrator for producing a first narrow pulse responsive to the leading edge of said rectangular pulse; circuit means including a condenser and resistor connected in series between said first narrow pulse producing means and said oscillographic trace producing means for superimposing said first narrow pulse on said oscillographic trace; additional means coupled to the output of said driven multivibrator for producing a second narrow pulse responsive to the trailing edge of said rectangular pulse; circuit means including a condenser and resistor connected in series between said second narrow pulse producing means and said oscillographic trace producing means for superimposing said second narrow pulse on said oscillographic trace; and means in said circuit for manually adjusting the duration of said rectangular pulse so that said second superimposed narrow pulse intersects said oscillographic trace at a point which is the intersection of a line drawn parallel to said time base through the intersection of said first superimposed narrow pulse with said trace, said driven multivibrator including two triodes and said pulse duration manually adjusting means including a variable capacitance connected between the plate of one tube and the grid of the other tube of said driven multivibrator and a variable resistor connecting said other tube grid to the tube bias potential.

3. The invention as defined in claim 2, and circuit means for measuring the interval between said first and second narrow pulses comprising a time interval counter connected between said first and second narrow pulse producing means.

4. In a system for measuring the reversing time of a periodically reversing driven load comprising: a twin type magnetic clutch having a pair of coils mechanically coupled to said load; a free running multivibrator connected to said coils for alternately energizing said coils; a first differentiator connected to an output circuit of said free running multivibrator for producing a narrow pulse at the initiation of a reversing cycle; a driven multivibrator connected to said differentiator and triggered by said narrow pulse for producing a rectangular pulse; means including second and third differentiators connected to said driven multivibrator for producing a second and a third narrow pulse responsive to the leading and trailing edges of said rectangular pulse, respectively; means coupled to said load for producing an oscillographic trace of the angular displacement of said load along a time base, means connecting said second and third differentiators to said trace producing means for superimposing said second and third narrow pulses on said trace; means connected to said driven multivibrator for adjusting the duration of said rectangular pulse to adjust the point of occurrence of said third narrow pulse on said trace so that said second and third narrow pulses are equidistant from the point of zero velocity; and circuit means connected between said second and third differentiators including a time interval counter for measuring the interval between said second and third narrow pulses.

5. A system for determining the reversal time of an alternately reversible load comprising; means for reversing said load; means connected to said load for producing a first visual trace of the angular displacement of said load along a time base; means connected to said load reversing means and responsive to the initiation of an alternate reversal of said load for producing a rectangular pulse; means connected to said rectangular pulse producing means and including first and second differentiators for producing a first and second pip responsive to the occurrence of the leading and trailing edges, respectively, of said rectangular pulse; means connected between said differentiators and said first trace producing means for producing a second visual trace of said pips along said time base and for superimposing said second trace on said first trace; means connected to said pulse producing means for adjusting the duration of said rectangular pulse whereby the time of occurrence of said second pip may be varied so that said first and second pips appear on said first trace at points equidistant from a point of zero angular velocity along said time base; and means connected to said differentiators including a time interval counter for measuring the duration of said adjusted rectangular pulse.

References Cited in the file of this patent

UNITED STATES PATENTS

| | | |
|---|---|---|
| 2,492,617 | Boland | Dec. 27, 1949 |
| 2,551,771 | Spielman | May 8, 1951 |
| 2,561,172 | Bischoff | July 17, 1951 |
| 2,591,738 | Spencer | Apr. 8, 1952 |
| 2,644,133 | Soukaras | June 30, 1953 |